United States Patent [19]
Wilson

[11] Patent Number: 5,480,096
[45] Date of Patent: Jan. 2, 1996

[54] MOBILE WATERING DEVICE

[75] Inventor: Mitchell E. Wilson, Belton, Mo.

[73] Assignee: Innovation Corporation, Belton, Mo.

[21] Appl. No.: 302,359

[22] Filed: Sep. 7, 1994

Related U.S. Application Data

[63] Continuation-in-part of Ser. No. 162,228, Dec. 6, 1993, abandoned.

[51] Int. Cl.⁶ ........................................................ B05B 9/03
[52] U.S. Cl. ............................ 239/148; 239/74; 239/146; 239/379; 239/578
[58] Field of Search ........................ 239/71, 74, 146, 239/172, 175, 379, 530, 578, 583, 148, 152–154; 222/608, 510, 529, 530

[56] References Cited

U.S. PATENT DOCUMENTS

| 224,944 | 2/1880 | Norton | 239/154 |
| 422,782 | 3/1890 | Hills et al. | 239/154 |
| 2,384,174 | 9/1945 | Jones | 222/608 |
| 2,394,415 | 2/1946 | Wilkinson et al. | 239/148 |
| 2,645,381 | 7/1953 | Lattman | 222/530 |
| 2,752,200 | 6/1956 | Santarelli | 239/154 |
| 3,023,969 | 3/1962 | Hudson et al. | 239/146 |
| 3,134,519 | 5/1964 | Tidd | 222/530 |
| 3,265,308 | 8/1966 | Hopkins | 239/172 |
| 3,837,539 | 9/1974 | Schlegel | 222/178 |
| 3,920,161 | 11/1975 | Kenzlan | 222/608 |
| 4,865,255 | 9/1989 | Luvisotto | 239/149 |
| 5,072,884 | 12/1991 | Ellison et al. | 239/152 |

FOREIGN PATENT DOCUMENTS

| 616954 | 2/1961 | Italy | 222/608 |
| 899099 | 6/1962 | United Kingdom | 222/608 |

Primary Examiner—Karen B. Merritt
Attorney, Agent, or Firm—Litman, McMahon and Brown

[57] ABSTRACT

A portable watering device includes a reservoir having an upper inlet and a lower outlet, a portable delivery wand having a top handle, a bottom channel, and a shiftable channel closure mechanism biased in the closed position. The top handle includes a trigger remotely coupled with the closure mechanism for activating the closure mechanism. A flexible hose intercouples the reservoir outlet and the wand channel and serves to convey liquid from the tank and out through the wand channel by gravity when the closure mechanism is in the open position. A pair of wheels is mounted to the bottom portion of the reservoir to permit easy rolling movement of the device over uneven terrain. In particularly preferred forms, the reservoir includes a laterally extending handle for supporting the device in a horizontal loading position while the reservoir is filled through the upper inlet.

19 Claims, 2 Drawing Sheets

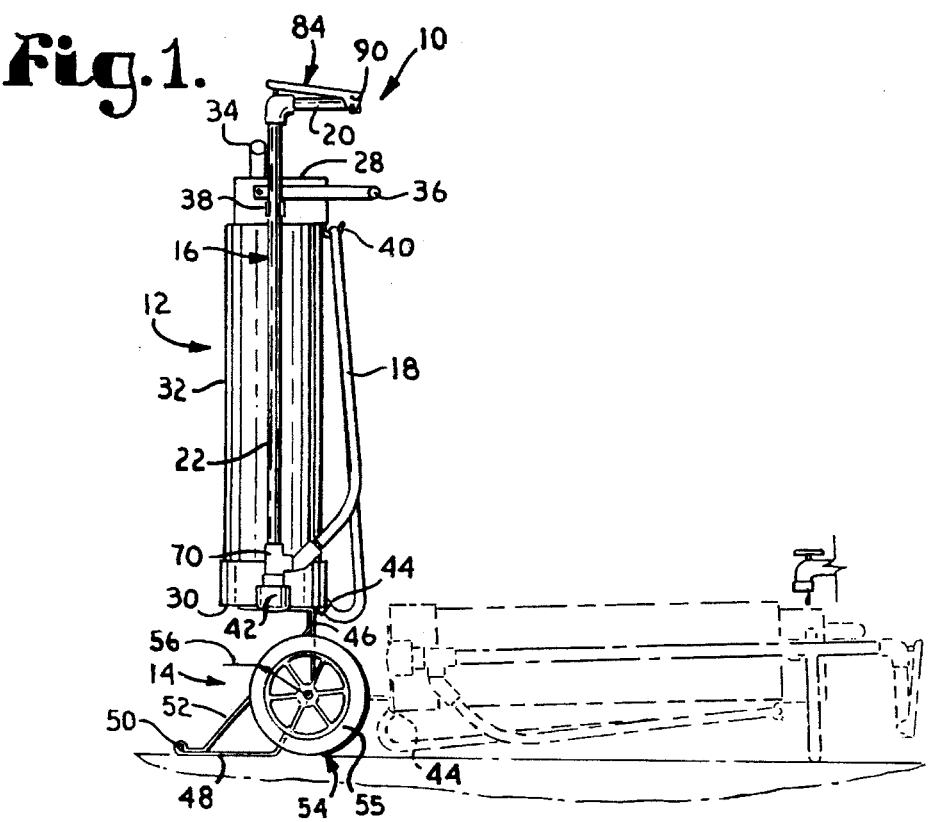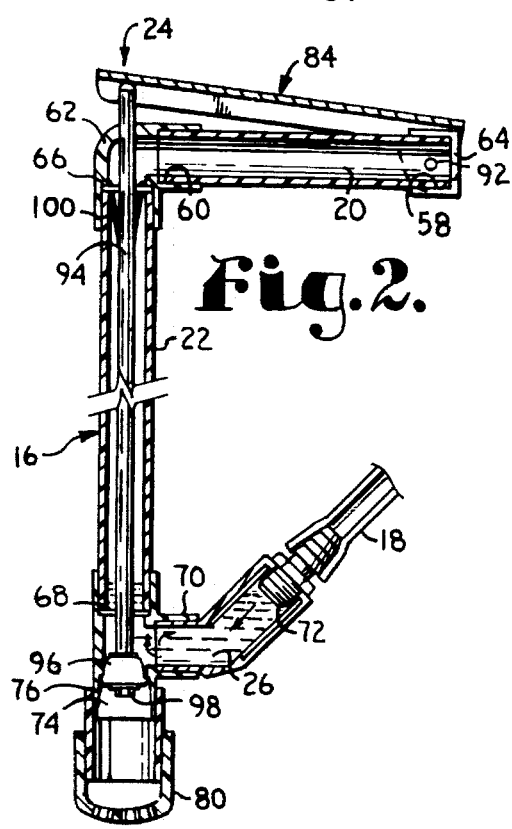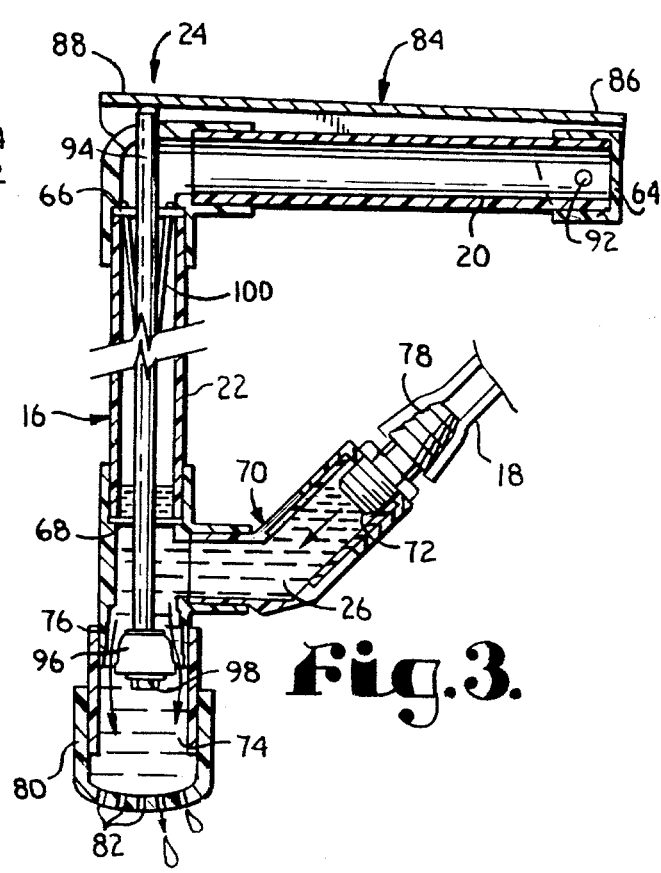

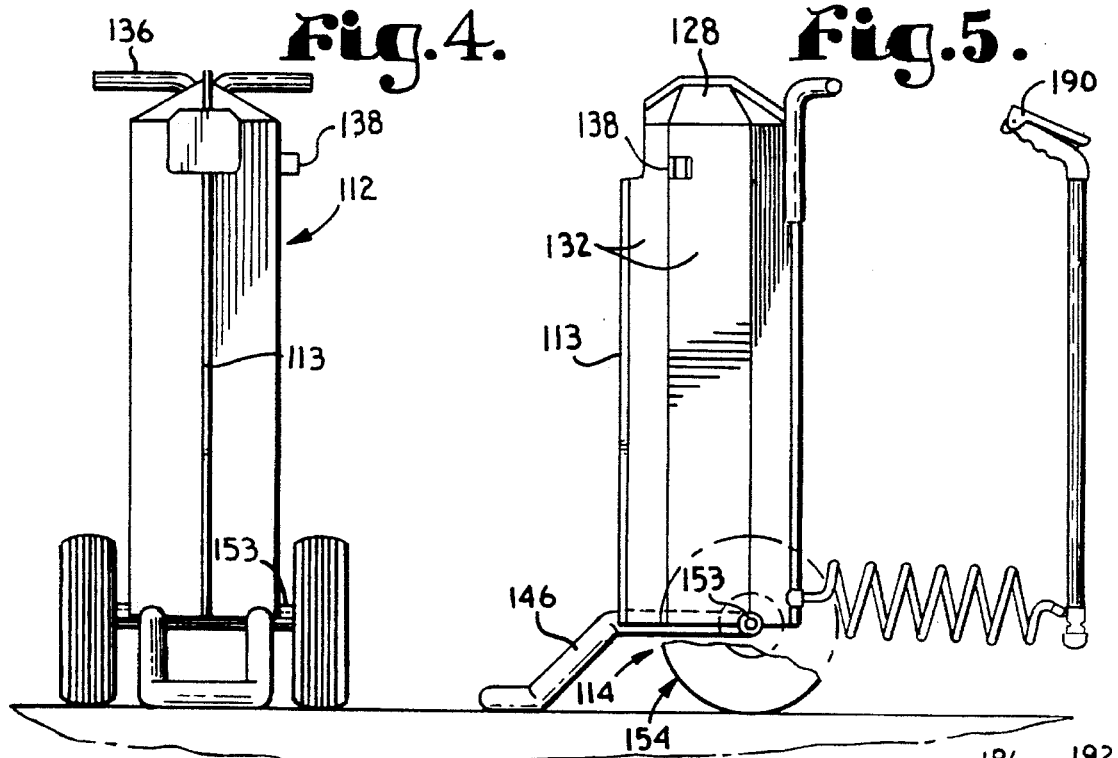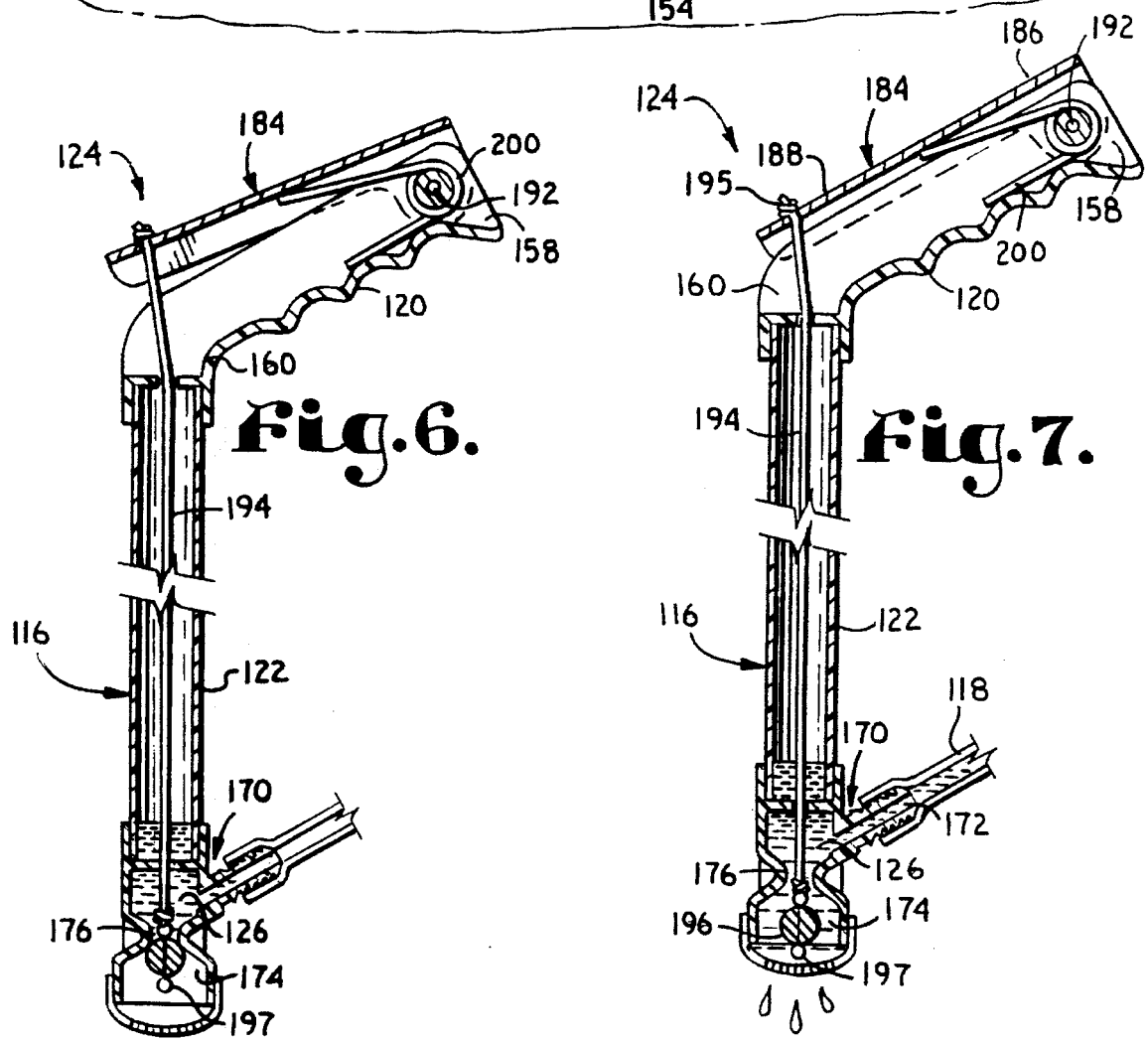

5,480,096

MOBILE WATERING DEVICE

CROSS REFERENCE TO RELATED APPLICATION

This application is a continuation-in-part of U.S. patent application Ser. No. 08/162,228, filed Dec. 6, 1993, now abandoned.

BACKGROUND OF THE INVENTION

1. Field of the Invention

The present invention is broadly concerned with an improved mobile watering device specifically designed to provide an easily portable, wheeled reservoir which permits spot watering at the base of a plant by a user without the need for pumping, bending, or kneeling. More particularly, it is concerned with such a device including a portable delivery wand having structure permitting hand-operated dispensing of a liquid at ground level by gravity flow from a remote reservoir outlet. In addition, the device preferably includes an upper inlet and laterally extending handle permitting the device to be readily moved in an upright orientation and alternately placed in a horizontal loading position to facilitate filling with a liquid from a low-clearance source such as a conventional outdoor household faucet.

2. Description of the Related Art

Related art mobile watering devices have been expensive, cumbersome, inconvenient to operate and generally incapable of spot watering at the base of a plant without the use of a pump. Some of these devices, such as those described in U.S. Pat. Nos. 4,865,255; 3,837,539; 3,265,308; and 3,023,969; and 2,394,415 require pumps in order for a user to apply the liquid from a standing position. Electric pumps limit the mobility of the device in that they require connection to an electrical outlet. Hand operated pumps require interruption of the watering operation for intermittent pumping by the user to maintain pressure. Use of a pump augments the price of the watering device and subjects it to additional maintenance requirements and breakdowns. Other devices, such as those disclosed in Italian Patent No. 616,954; U.S. Pat. No. 3,920,161; and British Patent No. 899,099 have employed gravity flow by elevating the reservoir, requiring the reservoir to be positioned directly over the vegetation to be watered, or requiring the user to bend or kneel in order to water at the base of the plant. Such devices are cumbersome, unsuitable for watering larger plants such as bushes and trees, and inconvenient to use.

SUMMARY OF THE INVENTION

The present invention overcomes the problems previously outlined and provides a greatly improved portable watering device designed for easy portability and operation by a user from a standing position.

Broadly speaking, the device includes a reservoir having an upper inlet and a lower outlet, a portable delivery wand having a top handle, a bottom channel, and a shiftable channel closure mechanism which is biased in the closed position. The top handle includes an activating trigger remotely coupled with the closure mechanism. A flexible hose intercouples the reservoir outlet and the wand channel and serves to convey liquid from the tank through the wand channel by gravity when the closure mechanism is in the open position. A pair of wheels is mounted to the bottom portion of the reservoir to permit easy rolling movement of the reservoir over the terrain.

In particularly preferred forms, the reservoir includes a laterally extending handle for supporting the device in a horizontal loading position while the reservoir is filled through the upper inlet.

OBJECTS AND ADVANTAGES OF THE INVENTION

The principal objects and advantages of the present invention include: providing an easily portable, mobile gravity watering device; providing such a device which permits spot watering at the base of both large and small plants by a user from a standing position without the necessity for bending or kneeling; providing such a device which can be filled from a horizontal position with a liquid from a low clearance source; providing such a device which does not require a pump for delivery of the liquid; providing such a device which does not require an electrical source for operation; providing such a device which is easy to operate; providing such a device which does not require elevation of the reservoir to provide pressure for delivery of the liquid; providing such a device having a hand-operated trigger device which is remote from the liquid delivery nozzle; providing such a device in which the liquid delivery nozzle is remote from the reservoir; providing such a device in which the liquid does not pass through the operating trigger on the way to the delivery nozzle; providing such a device in which the liquid passes through a self-coiling conduit; providing such a device which includes wheels for easy rolling movement across uneven terrain; providing such a device which includes a handle for pushing and pulling; providing such a device in which the operating mechanism is biased for automatic shut-off of the liquid flow when not engaged; providing such a device which is suitable for dispensing liquid chemicals; providing such a device in which the applicator wand serves as an indicator of the fluid level in the reservoir; and providing such a device which is of simple, economical construction.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevation of a mobile watering device in accordance with the present invention, with the horizontal loading position illustrated in phantom;

FIG. 2 is a sectional view of the operating assembly including trigger mechanism and closure member of FIG. 1, with parts broken away for clarity, showing the stopper in the closed position; and FIG. 3 is a sectional view of the operating assembly, trigger mechanism and closure member of FIG. 1, with other broken away for clarity, showing the closure member in the open position for permitting passage of liquid from the hose into the wand channel and outwardly through the nozzle.

FIG. 4 is a front elevation of another embodiment of the mobile watering device in accordance with the present invention;

FIG. 5 is a side elevation of the embodiment depicted in FIG. 4, showing the hose extended;

FIG. 6 is a sectional view of the operating assembly including trigger mechanism and closure member of FIG. 4, with parts broken away for clarity, showing the stopper in the closed position; and FIG. 7 is a sectional view of the operating assembly, trigger mechanism and closure member of FIG. 4, with parts broken away for clarity, showing the closure member in the open position for permitting passage of liquid from the hose into the wand channel and outwardly through the nozzle.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. Introduction and Environment

Referring now to the drawing, a mobile watering device 10 in accordance with the invention includes a reservoir 12 mounted atop a wheel assembly 14, a portable delivery wand 16 intercoupled with reservoir 12 by a hose 18 and having a handle 20 coupled with a shaft 22. As best shown in FIGS. 2 and 3, an operating assembly 24 permits remote selective opening and closing of a channel 26 in the lowermost portion of shaft 22 by a user in order to control gravity flow of a liquid from reservoir 12.

In more detail, reservoir 12 is preferably formed of a lightweight synthetic resin material and may be of integral construction. The preferred reservoir is generally cylindrical, although it may also be generally hexagonal, rectangular, spherical, or of any other suitable configuration. Reservoir 12 includes a generally circular top 28 and bottom 30, and a generally cylindrical sidewall 32.

The uppermost portion of sidewall 32 is apertured adjacent the top 28 to permit filling from a horizontal position and admission of air into the reservoir 12 to equalize pressure in the reservoir and prevent formation of a vacuum as the liquid contents are delivered. Top 28 also includes an upstanding handle 34. As best shown in FIG. 1, the uppermost, unapertured portion of sidewall 32 includes a laterally projecting handle 36 which serves to support reservoir 12 in the horizontal filling position. The upper portion of sidewall 32 also includes an outstanding clip 38 for supporting wand 16 when not in use, and a hook 40 for stowing hose 18.

The lowermost portion of sidewall 32 is coupled with a generally cup-shaped wand support 42 in spaced relationship to a generally downwardly projecting nipple 44 for connecting hose 18 with reservoir 12. In certain preferred embodiments, nipple 44 may depend directly from reservoir bottom 30. In other embodiments a filter assembly is coupled with nipple 44. Reservoir bottom 30 is coupled with a pair of spaced support legs 46, each of which extend downwardly and angle forwardly to terminate in a ground engaging foot portion 48, which may itself terminate in an upwardly projecting lip 50. A pair of support braces 52 intercouple the opposed ends of legs 46 and feet 48 so that legs 46, feet 48, and braces 52 cooperatively form a generally truncated triangular configuration when viewed from the side. In addition, a brace (not shown) may extend transversely between feet 48.

Wheel assembly 14 includes a pair of ground-engaging wheels 54 mounted for rotation on an axle (not shown) which spans and passes through support legs 46. Each wheel 54 presents a radius 56. Support legs 46 may be mounted in spaced relationship at any points on reservoir bottom 30. In preferred embodiments the legs are offset from the center of reservoir bottom 30 so that in the upright position a portion of reservoir 12 extends forwardly of wheels 54. In such embodiments the wheels extend rearwardly of reservoir 12 for a distance of up to about the length of radius 56. As shown in FIG. 1, side handle 36 extends outwardly from reservoir sidewall 32 a distance at least as great as radius 56 so that the device can be cooperatively supported by the handle 36 and wheels 54 in a generally horizontal loading position on a support surface.

Wheels 54 may be of solid construction with molded spokes or of conventional open construction with spokes extending outwardly from a hub. The preferred wheels also include tires 55 of flexible rubber or synthetic resin for cushioning and enhanced mobility. The tires may be of solid, hollow, pneumatic, or any suitable construction. Wheels 54 are preferably constructed of the largest practicable and economical size in order to facilitate easy rolling over uneven terrain, although smaller wheels may be employed for patio use. Wider tires 55 may be utilized to prevent sinking into soft or tilled soil, or where smaller wheels are employed. The wheels are preferably mounted in spaced relationship about 14 to 16 inches apart for enhanced stability of the unit, although any suitable wheelbase may be employed.

Wand 16 includes a handle 20 coupled with a shaft 22. Wand handle 20 includes a projecting first end 58 and a second end 60 coupled with shaft 22. Handle 20 and shaft 22 may be intercoupled by an elbow or bend 62, preferably having an angle of 90° or greater, or they may be of unitary construction. Elbow 62 is of generally hollow construction and includes an apertured superior surface. First handle end 58 is preferably covered by a cap 64 to prevent entry of soil and insects.

Hollow wand shaft 22 is also coupled with elbow 62 and includes centrally apertured upper and lower guide plates 66, 68. The lowermost portion of shaft 22 is coupled with a hollow, generally T-shaped fitting 70 having an apertured inlet portion 72, an apertured outlet portion 74 and providing a channel 26 therebetween. The channel adjacent outlet portion 74 is narrowed to form a valve seat 76. Inlet 72 is fitted with a nipple 78 for coupling with hose 18. In certain embodiments a coil spring may be installed inside the hose adjacent nipple 78 to prevent kinks. Outlet 74 is fitted with a removable nozzle 80 having apertures 82 to permit spray delivery of the reservoir contents.

Wand 16 is preferably constructed of lightweight synthetic resin construction, such as ¾" pvc pipe, although it may also be formed of a metal such as stainless steel, aluminum, or any other suitable material. Handle 20 and elbow 62 may be of unitary construction or coupled. Shaft 22 and T-fitting 70 may also be of unitary construction. Shaft 22 may be uncoupled from elbow 62 for replacement of operating assembly parts. The graspable portion of handle 20 may be formed to include structure defining grooves to accommodate the fingers of a user. In certain preferred embodiments, wand shaft 22 is constructed of a clear or translucent material and lower guide plate 68 is perforate to permit fluid to rise in the wand. In such embodiments when wand 16 is held adjacent to reservoir 12, the fluid level in the wand will serve as an indicator of the fluid level in reservoir 12.

Hose 18 is preferably constructed of rubber or a synthetic resin tubing such as polyethylene. A kinkless type hose is preferably employed to ensure a free flow of fluid through the hose as wand 16 is moved about by a user.

Operating assembly 24 includes an elongate trigger 84 coupled with handle 20 and positioned remote from fluid outlet 74. Trigger 84 includes first and second ends 86, 88 and a pair of depending flanges 90 adjacent first end 86. First handle end 58, cap 64, and flanges 90 are apertured to accommodate a transversely mounted pivot pin 92 which pivotally intercouples handle 20 and trigger 84. Trigger 84 is of unitary construction and may also be formed of the same materials as wand 16. An elongate push rod 94 extends from second trigger end 88 through apertured elbow 62, upper guide plate 66, wand shaft 22, lower guide plate 68, channel 26, and into valve seat 76 where it extends through a centrally apertured stopper 96. The lowermost end of rod 94 is threaded to receive a retaining nut 98. Rod 94 is apertured adjacent the uppermost portion for coupling with a circular, elastic-type spring member 100. Upper guide plate 66 includes lands for anchoring the spring 100. In this manner rod 94 is biased upwardly for maintaining stopper 96 within valve seat 76 in occluding relationship to outlet 74.

In certain preferred embodiments rod 94 is apertured adjacent the lowermost portion for coupling with spring 100 and lower guide plate 68 includes lands for anchoring spring 100. In such embodiments upper guide plate 66 may be omitted.

Still other preferred embodiments employ a pair of springs to bias stopper 96 in the closed-channel position. In such embodiments a torsion spring is mounted about pivot pin 92 for biasing trigger 84 in the open position. In addition, trigger second end 88 is apertured and the upper portion of push rod 94 is coupled with a cord which in turn passes upwardly through apertured elbow 62, apertured trigger end 88, and terminates in a retaining knot. The lower end of push rod 94 extends through apertured stopper 96, which may be of ball-type construction, and terminates in an eye fitting. Circular elastic type spring 100 passes through the eye fitting and is anchored to notches formed in the lowermost portion of outlet 74 to bias stopper 96 in the open-channel position.

In operation, a user grasps side handle 36 and tilts reservoir 12 backwardly on wheels 54 until the unit is cooperatively supported at either end by handle 36 and wheels 54 in a generally horizontal position. Apertured reservoir 12 can then be filled from a low clearance water source such as a household outdoor tap. The reservoir may be filled with water, a chemical solution such as fertilizer, pesticide, or herbicide, or with any other suitable liquid.

The user then grasps handles 34, 36 to raise the filled reservoir to a generally upright position and pulls handle 34 to lead the device while walking ahead. Alternately, the user can push on handle 34 to propel the device forwardly while walking behind it. Handles 34 and 36 and wheel assembly 14 thus cooperatively permit easy pushing and pulling of reservoir 12 over even rough terrain.

When the device is rolled to the vicinity of a plant to be watered, the user tilts the device forwardly to a generally upright position supported by feet 48. The user grasps wand handle 20, releases wand shaft 22 from clip 38 and lifts upwardly to remove the wand from support cup 42. The wand is then positioned adjacent the base of the plant to be watered, the user depresses trigger 84, which in turn exerts a downward force on push rod 94, disengaging stopper 96 downwardly and away from valve seat 76 thus opening channel 26. The water in reservoir 12 flows by gravity downwardly and out through nipple 44 into hose 18, through wand nipple 78, into T-fitting inlet 72, through channel 26 and valve seat 76, around displaced stopper 96, and outwardly through outlet 74. Where nozzle 80 is employed, the water flows outwardly through nozzle apertures 82 in a spray.

When the watering is completed, the user releases trigger 84, permitting biasing spring 100 to urge push rod 94 upwardly until stopper 96 occludes valve seat 76, thus automatically terminating the flow of water. The wand can then be replaced in support cup 42, engaged by clip 38, and the device wheeled to another watering location as previously described.

The overall construction of the device eliminates the need for pumping since the liquid is delivered to the base of the plant by the downward force of gravity. The device is also not subject to the mobility limitations imposed by an electric cord. In addition, since the liquid flows downwardly from the base of reservoir 12 to the base of wand 16 and outwardly to the base of the plant through channel 26 by gravity it is not necessary to elevate reservoir 12 to achieve gravity flow. The flow of liquid from outlet 74 is controlled by a user from an upright position by depressing trigger 84 which is positioned at the uppermost end of wand 16. Since the outlet 74 is remote from the trigger 84, it is not necessary to position the reservoir 12 over the plant to be watered. Even large plants such as overhanging bushes or trees can be watered by a user from a standing position by moving the wand outlet 74 adjacent the base and depressing the handle-mounted trigger 84. The mobile watering device of the present invention can thus be easily employed without pumping, bending, or reaching by users of limited strength and mobility such as children, and the elderly, or handicapped.

SECOND PREFERRED EMBODIMENT

A second preferred embodiment of the portable watering device is depicted in FIGS. 4–7 to include structure substantially similar to that previously described with certain modifications to permit construction of a wand operating assembly having a flexible cord member in lieu of push rod 94. Such an operating assembly is particularly light weight, of economical construction, and permits a comfortable, obtusely-angled handle configuration.

Because of substantial similarity to the structure previously described, only selected structures in the second preferred embodiment will be numbered and characterized. Reservoir 112 is constructed in two parts and joined at an upstanding seam 113 to form a structure having a generally hexagonal cross section with planar sidewalls 132. A laterally projecting handle 136 supports the reservoir in the horizontal filling position. In this position the top of reservoir 112 may be abutted directly against a wall to permit filling from a wall-mounted faucet. It is not necessary to remove the wand for filling.

Reservoir 112 is cooperatively supported by the wheel assembly 114 and support step 146. The reservoir bottom (not shown) rests offset from its geometric midline atop axle 153 and the uppermost portion of a generally U-shaped support step 146. Such cooperative support imparts a low center of gravity, which facilitates handling and helps to prevent tipping.

Wand 116 includes a handle 120 coupled with an elongate hollow shaft 122. Wand handle 120 includes a series of finger grooves to facilitate gripping by a user. Handle 120 includes a projecting closed first end 158 and a second end 160 coupled with shaft 122. The superior surface of second end 160 is apertured.

The lowermost portion of wand shaft 122 is coupled with a hollow, generally Y-shaped fitting 170 having an apertured inlet portion 172, an apertured outlet portion 174, and providing a channel 126 therebetween. The channel is narrowed to form a valve seat 176 superior to outlet 174. The external surface of Y-fitting 170 adjacent inlet 172 is flighted to form a nipple for coupling with hose 118.

Hose 118 is preferably constructed of memory plastic having a closed-spring resting configuration. Such a hose is particularly light weight, kinkless, and coils automatically upon placement of wand 116 in the wand clip 138, thus obviating the need for a hose hook or other similar structure.

Operating assembly 124 includes an elongate trigger 184 coupled with handle 120. Trigger 184 includes first and second ends 186, 188 and a pair of depending flanges 190 adjacent first end 186. First handle end 158 and flanges 190 are apertured to accommodate pin 192 which pivotally intercouples handle 120 and trigger 184. A cord 194 commences in a retaining knot 195, extends downwardly through apertured second trigger end 188, handle second end 160, through wand shaft 122, channel 126, and valve seat 176. Stopper 196 is preferably of ball-type construction having a central aperture with a wire fitting 197 extending therethrough and terminating in an eyelet. The lowermost end portion of cord 194 is knotted to the eyelet. A torsion spring 200 is mounted about pivot pin 192 for biasing trigger 184 in the open position. Cord 194 may be constructed of any flexible material such as nylon, polyester or other synthetic resinous material, cotton or metal wire or wire rope. Weighted stopper 196 is preferably formed of metal or other heavy material such as lead, although any suitable material may be employed. Stopper 196 and fitting 197 may be coated with a vinyl or other synthetic resinous material to impart resilience.

In operation, the second preferred embodiment of the device is particularly light weight and comfortable to use. A user grasps wand handle 120, releases shaft 122 from clip 138 and lifts wand 116 upwardly. The lowermost portion of the wand is positioned adjacent the base of a plant to be watered, and the user depresses trigger 184, which permits stopper 196 to drop downwardly by force of gravity away from valve seat 176, thus opening channel 126 to permit outward passage of water from the reservoir 112.

When the watering is completed, the user releases trigger 184, permitting torsion spring 200 to urge trigger 184, knot 195, and attached cord 194 upwardly until stopper 196 occludes valve seat 176.

It is to be understood that while certain forms of the present invention have been illustrated and described herein, it is not to be limited to the specific forms or arrangement of parts described and shown.

What is claimed and desired to be secured by Letters Patent is as follows:

1. A mobile watering device comprising:
   (a) a reservoir having a top portion and a bottom portion, said top portion including an inlet and said bottom portion including an outlet, said reservoir including a handle for pushing and pulling said reservoir;
   (b) a pair of rotatable support wheels coupled with said bottom portion for rotatable support thereof for permitting rotatable movement of said reservoir;
   (c) a portable delivery wand having a handle portion and a delivery portion said delivery portion including a channel having an inlet and an outlet for permitting passage of a liquid therethrough;
   (d) a conduit intercoupling said reservoir outlet with said wand channel inlet;
   (e) shiftable closure means coupled with said channel for selective shifting between an open position wherein liquid is permitted to flow by gravity from said channel inlet and through said channel outlet and a closed position wherein passage of liquid through said channel outlet is prevented; and
   (f) operating means for selectively shifting said closure means between said open position and said closed position.

2. A mobile watering device comprising:
   (a) a reservoir having a top portion and a bottom portion, said top portion including an inlet and said bottom portion including an outlet wherein said reservoir further includes a handle for pushing and pulling said reservoir, said handle extending laterally from said reservoir for supporting said reservoir on a support surface in a horizontal loading position;
   (b) a pair of rotatable support wheels coupled with said bottom portion for rotatable support thereof for permitting rollable movement of said reservoir;
   (c) a portable delivery wand having a handle portion and a delivery portion, said delivery portion including a channel having an inlet and an outlet for permitting passage of a liquid therethrough;
   (d) a conduit intercoupling said reservoir outlet with said wand channel inlet;
   (e) shiftable closure means coupled with said channel for selective shifting between an open position wherein liquid is permitted to flow by gravity from said channel inlet and through said channel outlet and a closed position wherein passage of liquid through said channel outlet is prevented; and
   (f) operating means for selectively shifting said closure means between said open position and said closed position.

3. A mobile watering device comprising:
   (a) a reservoir having a top portion and a bottom portion, said top portion including an inlet and said bottom portion including an outlet;
   (b) a pair of rotatable support wheels coupled with said bottom portion for rotatable support thereof for permitting rollable movement of said reservoir;
   (c) a portable delivery wand having a handle portion and a delivery portion, said delivery portion including a channel having an inlet and an outlet for permitting passage of a liquid therethrough, said wand delivery portion including apertured spray means coupled with said channel outlet for permitting spraying of said liquid;
   (d) a conduit intercoupling said reservoir outlet with said wand channel inlet;
   (e) shiftable closure means coupled with said channel for selective shifting between an open position wherein liquid is permitted to flow by gravity from said channel inlet and through said channel outlet and a closed position wherein passage of liquid through said channel outlet is prevented; and
   (f) operating means for selectively shifting said closure means between said open position and said closed position.

4. A mobile watering device adapted for placement and filling on a support surface, said device comprising:
   (a) a reservoir having a top portion and a bottom portion, said top portion including an inlet and said bottom portion including an outlet;

(b) a pair of rotatable support wheels coupled with said bottom portion for rotatable support thereof for permitting rollable movement of said reservoir, said wheels each presenting a radius;

(c) said reservoir top portion presenting a handle extending laterally a distance at least as great as said radius for permitting said device to be moved from a transport position wherein said reservoir is generally upright, and a loading position wherein said reservoir is supported on a support surface in generally horizontal orientation by said wheels and said handle for filling with a liquid;

(d) a portable delivery wand having a handle portion and a delivery portion, said delivery portion including a channel having an inlet and an outlet for permitting passage of a liquid therethrough;

(e) a conduit intercoupling said reservoir outlet with said wand channel inlet;

(f) shiftable closure means coupled with said channel for selective shifting between an open position wherein liquid is permitted to flow by gravity from said channel inlet and through said channel outlet and a closed position wherein liquid is prevented from flowing through said channel outlet; and (g) operating means for selectively shifting said closure means between said open position and said closed position.

5. The device as set forth in claim 4 wherein said device further includes means for biasing said closure means toward said closed position.

6. The device as set forth in claim 4 wherein said reservoir further includes means for supporting said delivery wand when not in use.

7. The device as set forth in claim 4 wherein said wand delivery portion further includes apertured spray means coupled with said channel outlet for permitting spraying of said liquid.

8. The device as set forth in claim 4 wherein said conduit further includes a flexible hose member.

9. The device as set forth in claim 4 wherein said closure means further includes a stopper.

10. The device as set forth in claim 4 wherein said operating means further includes a shiftable trigger member for engagement by a user while grasping said wand handle portion.

11. A mobile watering device for user-controlled gravity delivery of a liquid and adapted for placement and filling on a support surface, said device comprising:

(a) a reservoir having a top portion and a bottom portion, said top portion including an inlet and said bottom portion including an outlet;

(b) a pair of rotatable support wheels coupled with said bottom portion for rotatable support thereof for permitting rollable movement of said reservoir, said wheels each presenting a radius;

(c) said reservoir top portion presenting a handle extending laterally a distance at least as great as said radius for permitting said device to be moved from a transport position wherein said reservoir is generally upright, and a loading position wherein said reservoir is supported on a support surface in generally horizontal orientation by said wheels and said handle for filling with a liquid;

(d) a portable delivery wand having a handle portion and a delivery portion, said delivery portion including a channel having an inlet and an outlet for permitting passage of a liquid therethrough and apertured spray means coupled with said channel outlet for permitting spraying of said liquid;

(e) a flexible hose member coupling said reservoir outlet with said wand channel inlet;

(f) a shiftable stopper coupled with said channel for selective shifting between an open position wherein liquid is permitted to flow by gravity from said channel inlet and through said channel outlet and a closed position wherein liquid is prevented from flowing through said channel outlet;

(g) an elongate push rod having an upper end and a lower end coupled with said stopper;

(h) a shiftable trigger member coupled with said wand handle portion for engagement by a user while grasping said handle portion, said trigger member engaging said push rod upper end for permitting remote selective shifting of said stopper by a user between said open position and said closed position; and (i) means for biasing said stopper toward said closed position when said trigger is released by a user.

12. A mobile watering device comprising:

(a) a reservoir having a top portion and a bottom portion, said top portion including an inlet and said bottom portion including an outlet;

(b) an elongate portable delivery wand having a first end including a pistol grip handle portion and a second end including a delivery portion, said delivery portion including a channel having an inlet and an outlet for permitting passage of a liquid therethrough, the length of the wand permitting application of liquid at the base of a plant by an upright user;

(c) a conduit intercoupling said reservoir outlet with said wand channel inlet;

(d) an elongate flexible cord member having an upper end and a lower end;

(e) shiftable closure means coupled with said cord member lower end in suspending relationship in said channel for selective shifting between an open position wherein liquid is permitted to flow by gravity from said channel inlet and through said channel outlet and a closed position wherein passage of liquid through said channel outlet is prevented; and (f) a shiftable trigger member coupled with said wand handle portion for engagement by a user while grasping said handle portion, said trigger member engaging said cord member upper end for permitting remote selective shifting of said closure means by a user between said open position and said closed position; and (g) means for biasing said closure means toward said closed position when said trigger is released by a user.

13. The device as set forth in claim 12 wherein said closure means further includes a stopper.

14. The device as set forth in claim 12 wherein said reservoir further includes a handle for pushing and pulling said reservoir.

15. The device as set forth in claim 14 wherein said handle extends laterally from said reservoir for supporting said reservoir on a support surface in a horizontal loading position.

16. The device as set forth in claim 12 wherein said conduit further includes a self-coiling hose member.

17. A mobile watering device comprising:

(a) a reservoir having a top portion and a bottom portion, said top portion including an inlet and said bottom portion including an outlet;

(b) a pair of rotatable support wheels coupled with said bottom portion for rotatable support thereof for permitting rollable movement of said reservoir;

(c) an elongate portable delivery wand having a handle portion and a delivery portion, said delivery portion including a channel having an inlet and an outlet for permitting passage of a liquid therethrough;

(d) a conduit intercoupling said reservoir outlet with said wand channel inlet;

(e) an elongate flexible cord member having an upper end and a lower end;

(f) shiftable closure means coupled with said cord member lower end in suspending relationship in said channel for selective shifting between an open position wherein liquid is permitted to flow by gravity from said channel inlet and through said channel outlet and a closed position wherein passage of liquid through said channel outlet is prevented; and (g) a shiftable trigger member coupled with said wand handle portion for engagement by a user while grasping said handle portion, said trigger member engaging said cord member upper end for permitting remote selective shifting of said closure means by a user between said open position and said closed position; and (h) means for biasing said closure means toward said closed position when said trigger is released by a user.

18. The device as set forth in claim 17 wherein said closure means further includes a stopper.

19. The device as set forth in claim 17 wherein said wand handle portion further includes a pistol grip.

* * * * *